(12) United States Patent
Bailey et al.

(10) Patent No.: US 12,127,517 B2
(45) Date of Patent: Oct. 29, 2024

(54) ASSURED IDENTITY SEEDER

(71) Applicant: Monsanto Technology LLC, St. Louis, MO (US)

(72) Inventors: Michael Bailey, St. Louis, MO (US); Corey G Barth, St. Louis, MO (US); Wayne Brown, St. Louis, MO (US); William M Fischer, St. Louis, MO (US); Bradley D Hart, St. Louis, MO (US); Armen Kachar, St. Louis, MO (US); Krishna Motaparti, St. Louis, MO (US); Kyle B Smith, St. Louis, MO (US); Sudhager Subramaniam, St. Louis, MO (US); Ryan K Tellor, St. Louis, MO (US); Matthew J Weis, St. Louis, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 774 days.

(21) Appl. No.: 17/296,248

(22) PCT Filed: Nov. 27, 2019

(86) PCT No.: PCT/US2019/063608
§ 371 (c)(1),
(2) Date: May 23, 2021

(87) PCT Pub. No.: WO2020/117589
PCT Pub. Date: Jun. 11, 2020

(65) Prior Publication Data
US 2022/0015304 A1     Jan. 20, 2022

Related U.S. Application Data

(60) Provisional application No. 62/774,484, filed on Dec. 3, 2018.

(51) Int. Cl.
*A01G 9/08* (2006.01)

(52) U.S. Cl.
CPC .................................. *A01G 9/085* (2013.01)

(58) Field of Classification Search
CPC .......... A01G 9/085; A01C 7/081; A01C 7/04; A01C 7/0443; A01C 11/02; A01C 15/003; A01C 2001/048
See application file for complete search history.

(56) References Cited

U.S. PATENT DOCUMENTS 3,849,041 A * 11/1974 Knapp ...................... A01C 1/06
                                                                  425/348 R
3,960,292 A *  6/1976 Knapp .................... B30B 11/34
                                                                    47/57.6

(Continued)

FOREIGN PATENT DOCUMENTS

EP        2774466 A2 *  9/2014  ............... A01C 7/06
EP        3409089 A1    12/2018

(Continued)

OTHER PUBLICATIONS

International Search Report for PCT/EP2019/063608 mailed Jan. 30, 2020.

(Continued)

*Primary Examiner* — Jamie L McGowan
(74) *Attorney, Agent, or Firm* — Sandberg Phoenix & von Gontard P.C.

(57) ABSTRACT

A high throughput system for depositing seed into germination wells of a germination tray. The system comprises a seed distribution subsystem, and an individual seed transfer subsystem structured and operable to transfer individual seeds from wells in a seed storage tray to the seed deposition subsystem. The system additionally comprises a bulk seed transfer subsystem structured and operable to singulate a plurality of bulk seeds and transfer each singulated seed to (Continued)

the seed deposition subsystem, wherein the seed distribution subsystem structured and operable to receive seeds from the individual seed transfer subsystem and the bulk seed transfer subsystem, and deposit the seeds into wells of the seed germination tray.

20 Claims, 12 Drawing Sheets

(56) References Cited

U.S. PATENT DOCUMENTS

| | | | | |
|---|---|---|---|---|
| 4,141,390 | A * | 2/1979 | Arnold | A01G 9/085 47/1.01 R |
| 4,221,175 | A * | 9/1980 | Van Wingerden | A01C 7/04 141/141 |
| 4,718,363 | A * | 1/1988 | Williames | A01C 7/044 111/91 |
| 7,044,306 | B2 * | 5/2006 | Deppermann | A01C 1/04 221/254 |
| 8,189,901 | B2 * | 5/2012 | Modiano | B07C 5/34 47/14 |
| 9,387,518 | B2 * | 7/2016 | Deppermann | B07C 5/368 |
| 11,622,496 | B2 * | 4/2023 | Kowalchuk | A01C 7/102 111/163 |
| 2003/0188998 | A1 | 10/2003 | Deppermann | |
| 2008/0000815 | A1 * | 1/2008 | Deppermann | B07C 5/368 209/552 |
| 2015/0177110 | A1 | 6/2015 | Cargill et al. | |
| 2016/0143212 | A1 * | 5/2016 | Wendte | A01C 21/005 111/183 |
| 2016/0302353 | A1 * | 10/2016 | Wendte | A01C 21/005 |
| 2017/0086351 | A1 | 3/2017 | Garner et al. | |
| 2018/0317375 | A1 * | 11/2018 | Weis | B07C 5/08 |
| 2021/0195829 | A1 * | 7/2021 | Crews | A01C 7/044 |

FOREIGN PATENT DOCUMENTS

| | | | |
|---|---|---|---|
| NL | 2011474 C | 3/2015 | |
| WO | 2016/118277 A1 | 7/2016 | |
| WO | WO-2016200825 A1 * | 12/2016 | A01C 1/04 |

OTHER PUBLICATIONS

Written Opinion for PCT/EP2019/063608 mailed Jan. 30, 2020.
Extended European Search Report issued Jan. 10, 2023 in EP App. No. 20792232.9.
Extended European Search Report for EP App. No. 19894378.9.

* cited by examiner

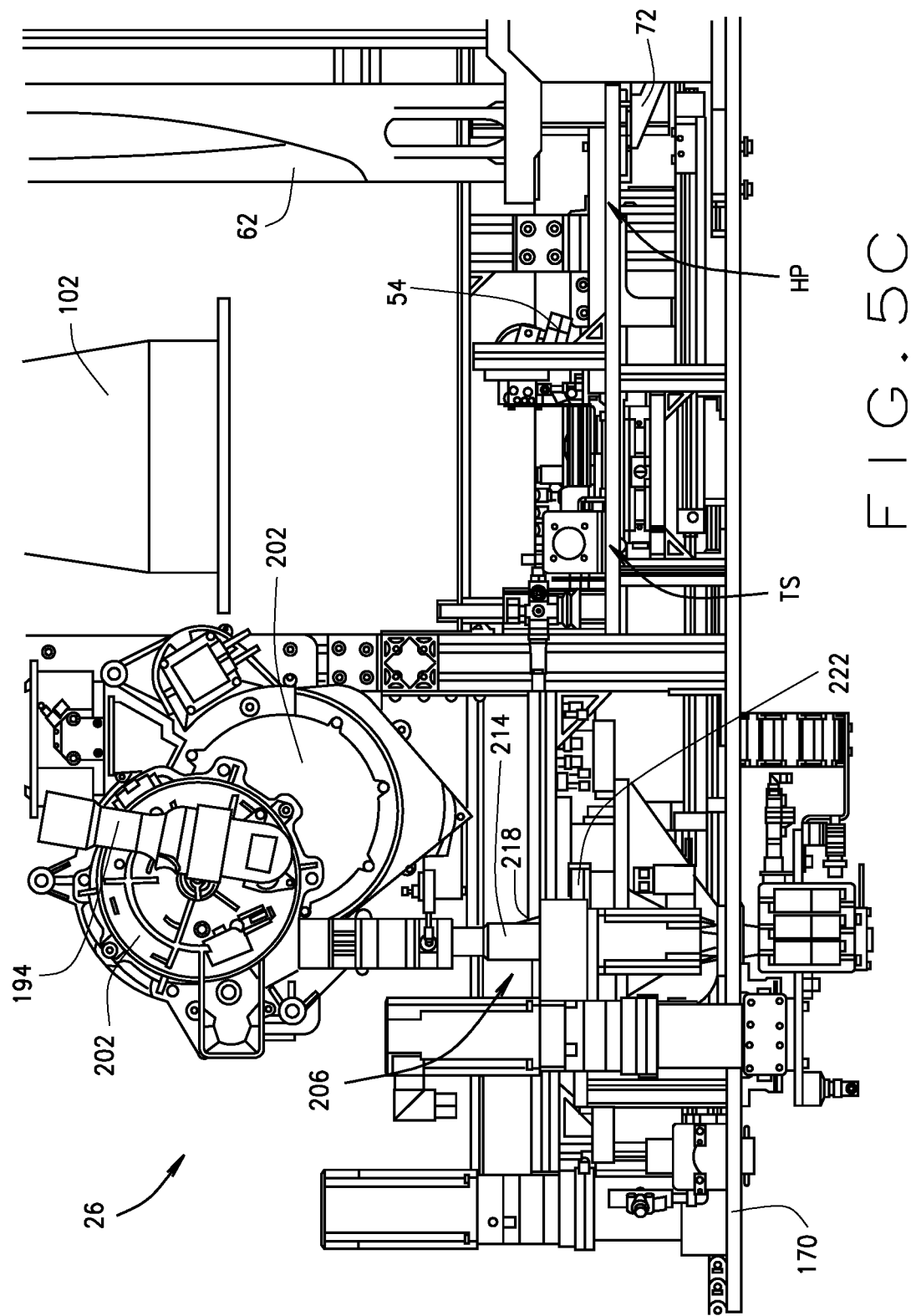

ASSURED IDENTITY SEEDER

CROSS-REFERENCE TO RELATED APPLICATIONS

The present application is the US national stage under 35 U.S.C. § 371 of International Application No. PCT/US2019/063608 which was filed on Nov. 27, 2019, and which claims the priority of U.S. Patent Application No. 62/774,484 filed on Dec. 3, 2018. The disclosures of the above applications are incorporated herein by reference in their entirety.

FIELD

The present teachings relate to plant breeding systems and processes for maintaining single seed identity of seeds from a seed sampling process through harvesting of plants grown from each respective seed.

BACKGROUND

The statements in this section merely provide background information related to the present disclosure and may not constitute prior art.

In plant breeding and selection processes, genotypic data can be gathered by performing DNA analysis on seed specimens then breeding plants based on the analysis. For example, at least one known breeding and selection process involves removing or extracting samples from a plurality of seeds in such a manner that leaves the sampled seeds viable for planting. Subsequently, the sampled seeds are planted in germination wells within a germination tray, e.g., a twenty-four well germination tray, and allowed to germinate keeping data correlating, or linking, each planted seed with the respective removed sample. Typically, each populated germination tray and/or well is marked to link the respective populated germination wells with the corresponding extracted chip. The germination trays are then placed side-by-side in a controlled growing environment, e.g., a greenhouse, resulting in hundreds or thousands of germination wells populated with germinating seeds being grouped together in the controlled growing environment.

In various known breeding processes, the identified viable sampled seeds are stored in a seed tray often referred to as an O-plate. Then during the germination process the sampled seeds are deposited in corresponding wells of a germination tray that are filled with a growing medium, after which the germination tray is placed in the growing environment. The present method of transferring the sampled seeds from the O-plate to the germination tray is to use a manually operated device, referred to as an Octopus Planter, which is a manual seed transfer device where the seeds are transferred from O-plate to germination trays using flexible tubing and gravity. In such known process, the Octopus Planter is typically used in conjunction with barcoded stakes placed in each germination tray wells, and a supporting data file to track the identity within each wells of the germination tray. This method is limited when it comes to partially filled O-Plates and different germination tray configurations. Additionally, such known processes often plant multiple pollinations groups from single project into multiple germination trays. These pollination groups are typically re-arrayed manually after seeds are germinated.

The manual germination process and the re-array process are prone to error and demand substantial human resources to perform the tasks. Additionally, it is important to maintain single seed identity when transferring the sampled seeds from the O-plate to a germination tray, which allows breeders to track a single plant from the sampling process through harvest. Currently there are no known seed germination systems or processes that are able to maintain such single seed identity from sampling through harvest.

SUMMARY

In various embodiments, the present disclosure provides a high throughput system for depositing seed into germination wells of a germination tray. The system generally comprises a seed distribution subsystem, and an individual seed transfer subsystem that is structured and operable to transfer individual seeds from wells in a seed storage tray to the seed deposition subsystem. The system additionally comprises a bulk seed transfer subsystem that is structured and operable to singulate a plurality of bulk seeds and transfer each singulated seed to the seed deposition subsystem. The seed distribution subsystem is structured and operable to receive seeds from the individual seed transfer subsystem and the bulk seed transfer subsystem, and deposit the seeds into wells of the seed germination tray.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 5C is a side view of a portion of the bulk seed transfer subsystem of the high throughput seed handling system shown in FIG. 5A, in accordance with various embodiments of the present disclosure.

Corresponding reference numerals indicate corresponding parts throughout the several views of drawings.

DETAILED DESCRIPTION

Figure 1A:
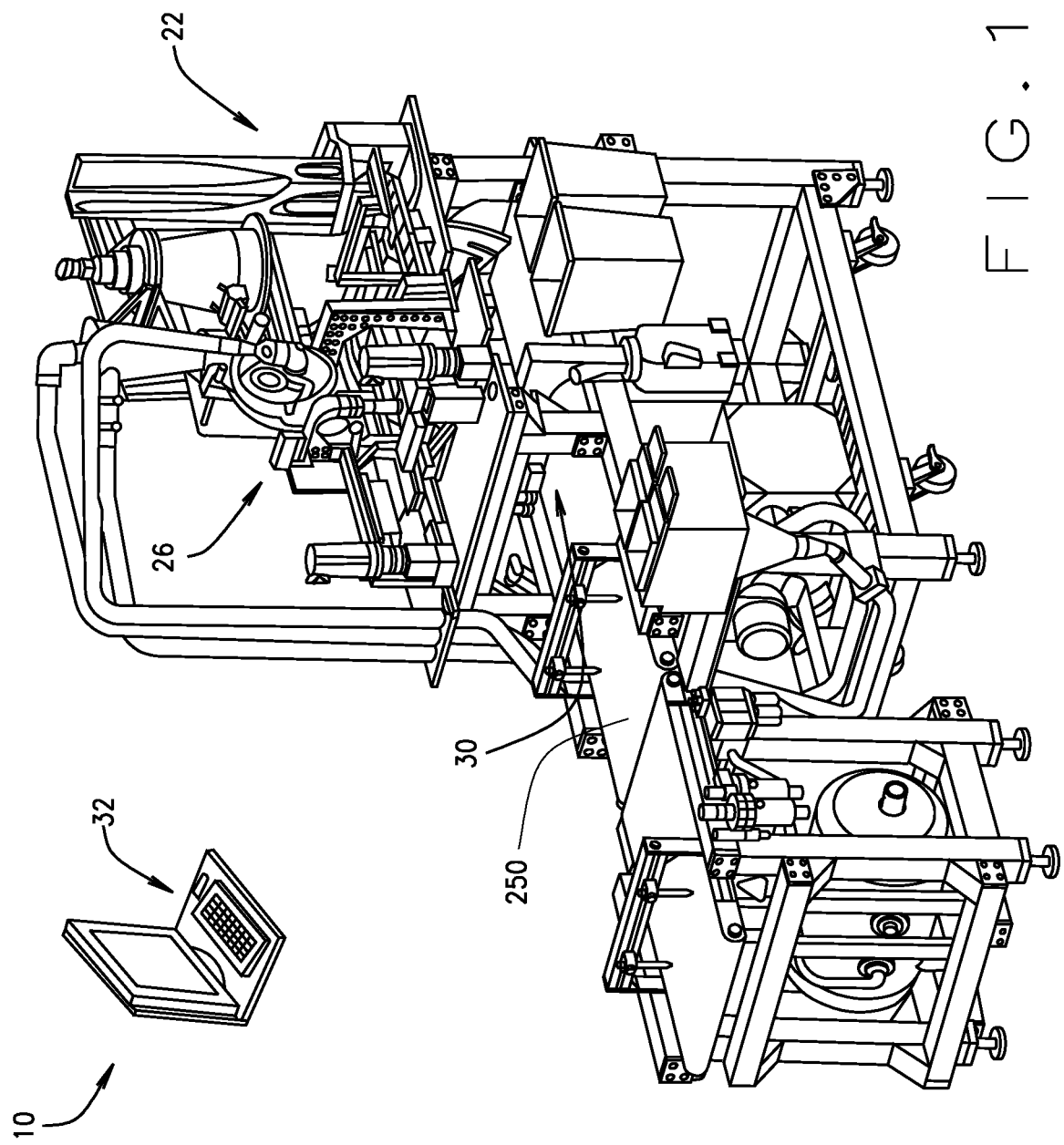
FIG. 1A is an isometric view of a high throughput seed handling system for depositing seed into germination wells of a germination tray, in accordance with various embodiment of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

As used herein, the term 'sampled seeds' will be understood to mean seeds that have had a portion thereof removed for genetic testing but the seed remains viable. Such seed sampling is sometimes referred to as seed chipping and the resulting seeds are referred to as chipped seeds.

Figure 1B:
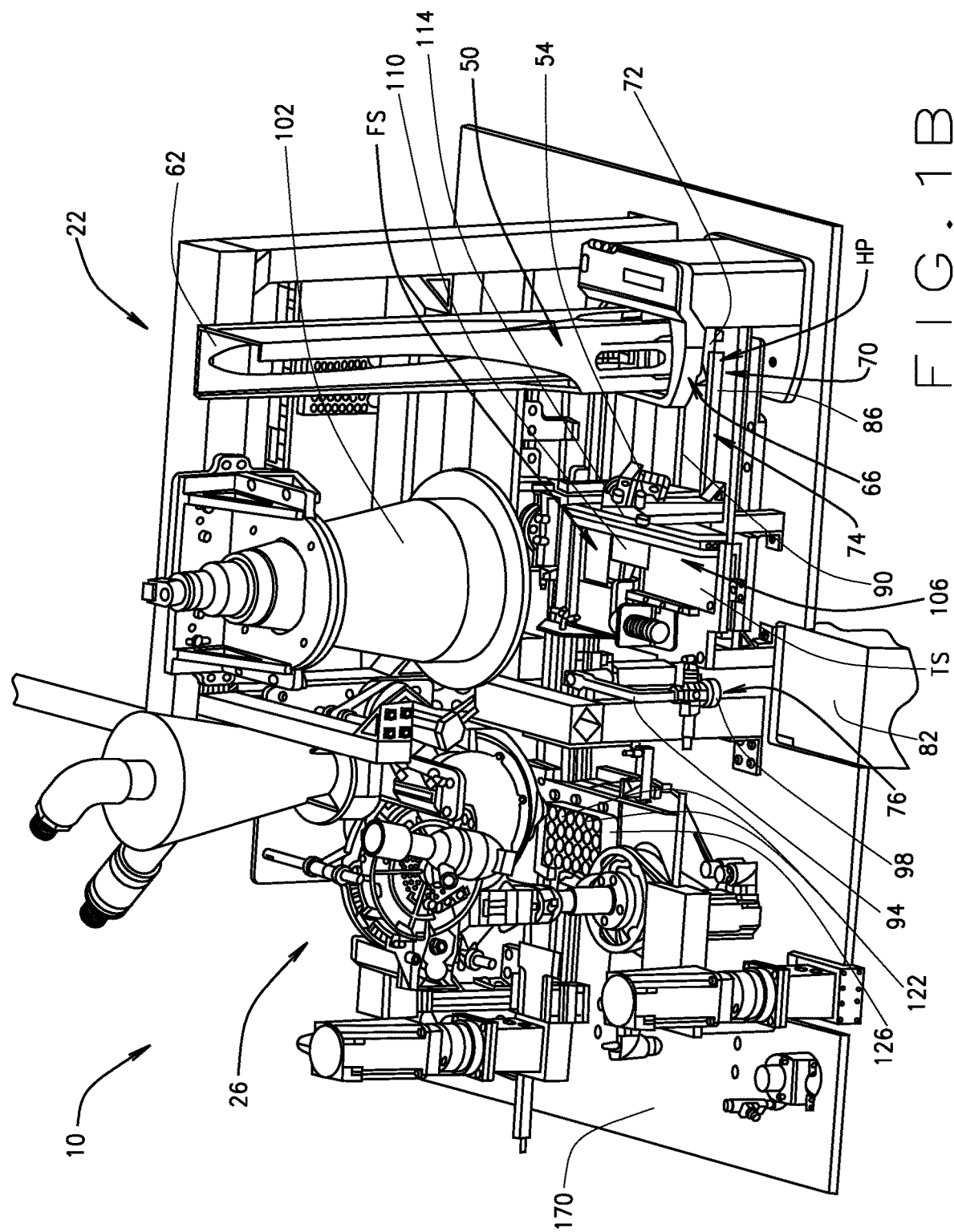
FIG. 1B is an isometric top view of a portion of the high throughput seed handling system shown in FIG. 1A illustrating an individual seed transfer subsystem and a bulk seed transfer subsystem thereof, in accordance with various embodiments of the present disclosure.
Figure 2A:
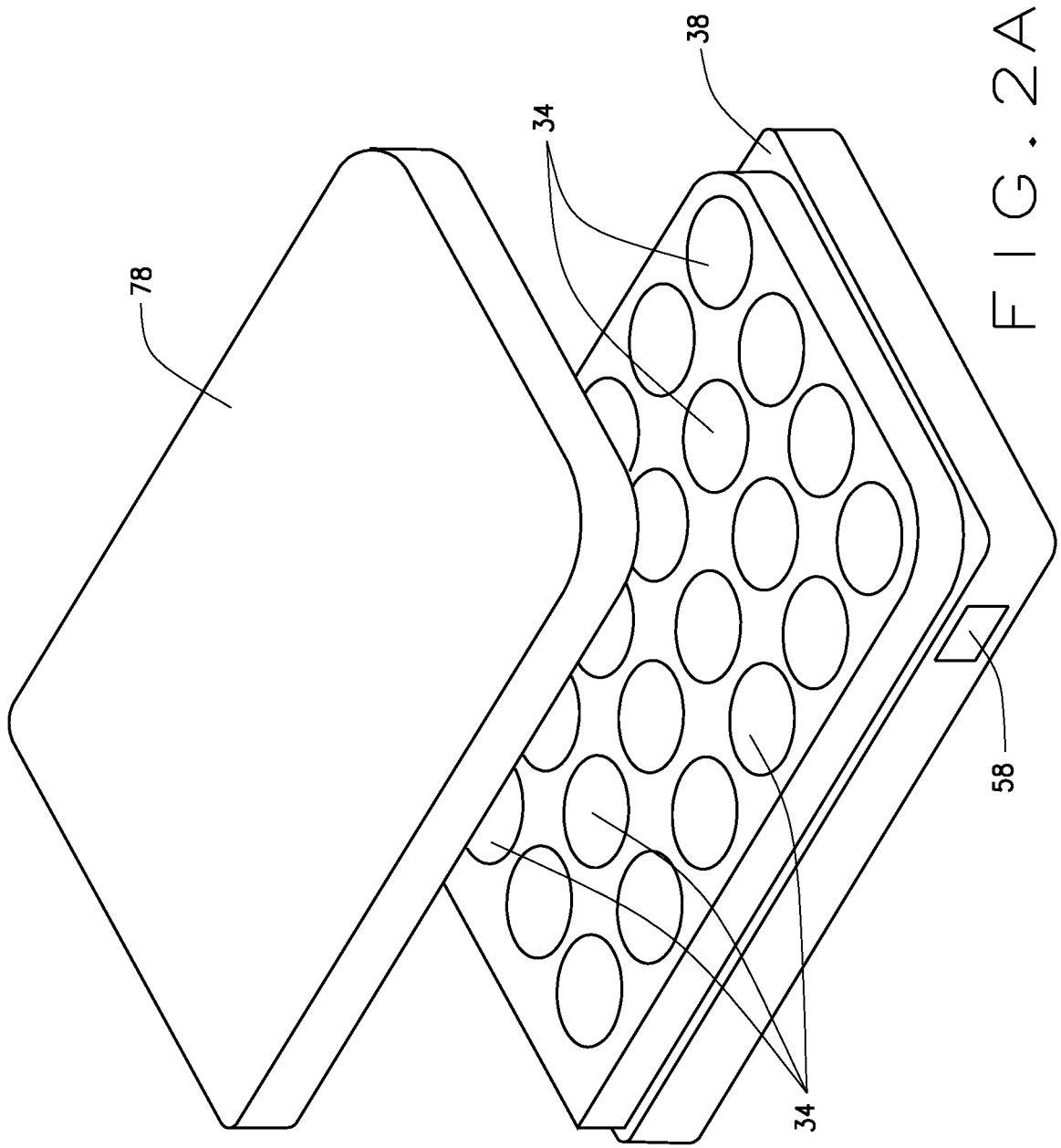
FIG. 2A is an isometric view of a seed storage tray used with the high throughput seed handling system shown in FIG. 1A, in accordance with various embodiments of the present disclosure.
Figure 2B:
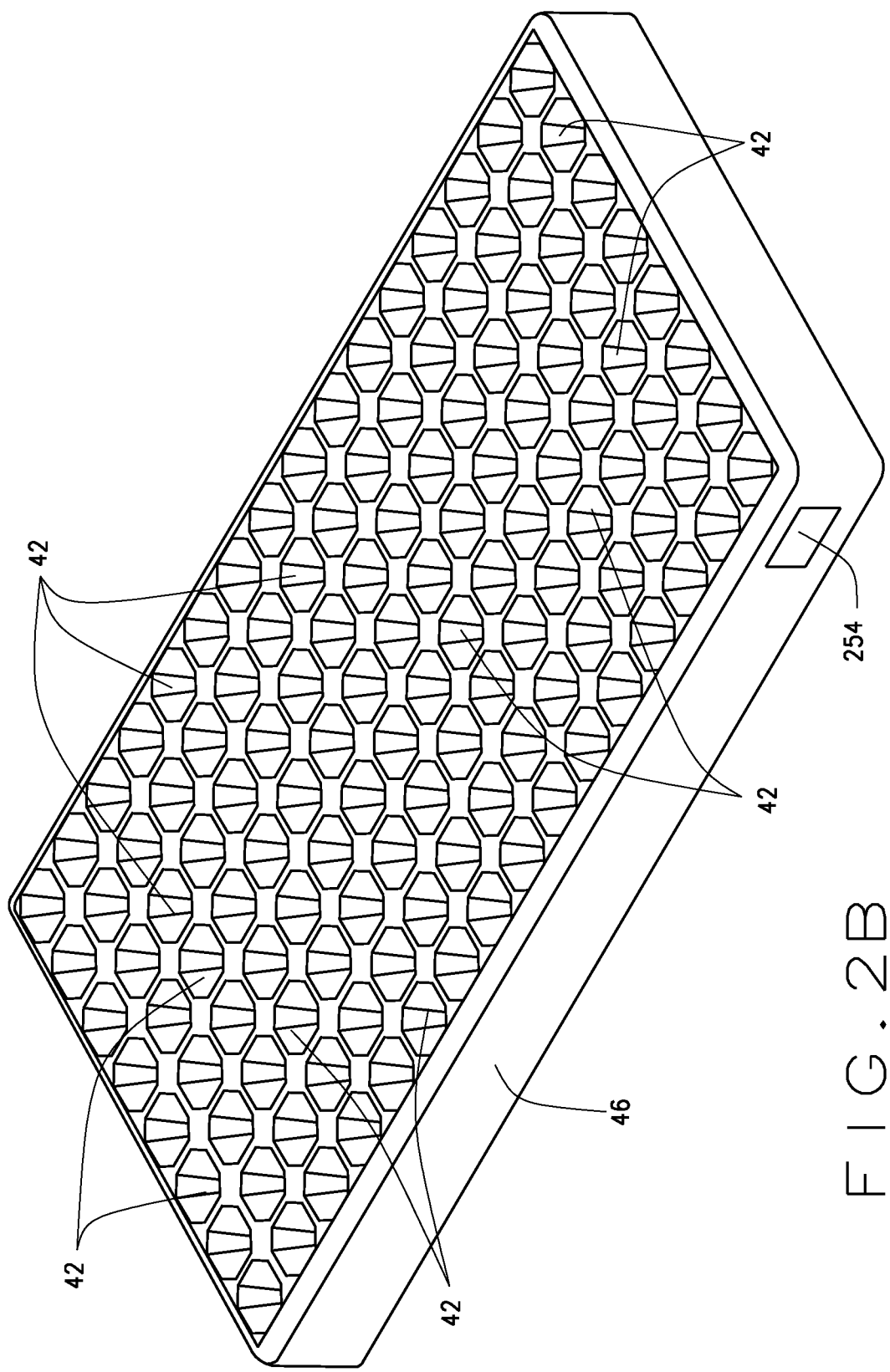
FIG. 2B is an isometric view of a seed germination tray used with the high throughput seed handling system shown in FIG. 1A, in accordance with various embodiments of the present disclosure.
Figure 3A:
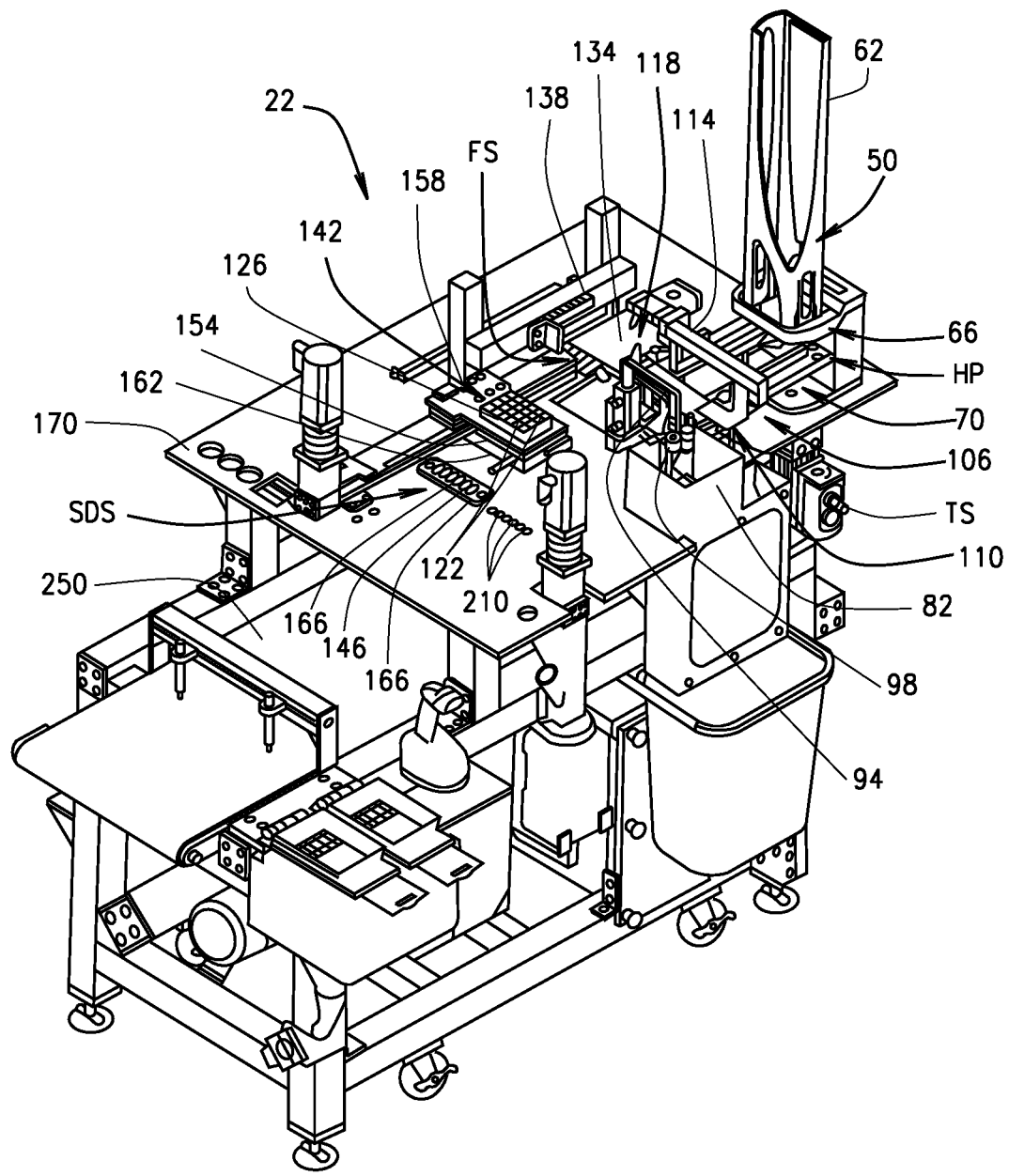
FIG. 3A is an isometric view of the individual seed transfer subsystem of the high throughput seed handling system shown in FIGS. 1A and 1B, having various structural components of the system removed, in accordance with various embodiments of the present disclosure.
Figure 3B:
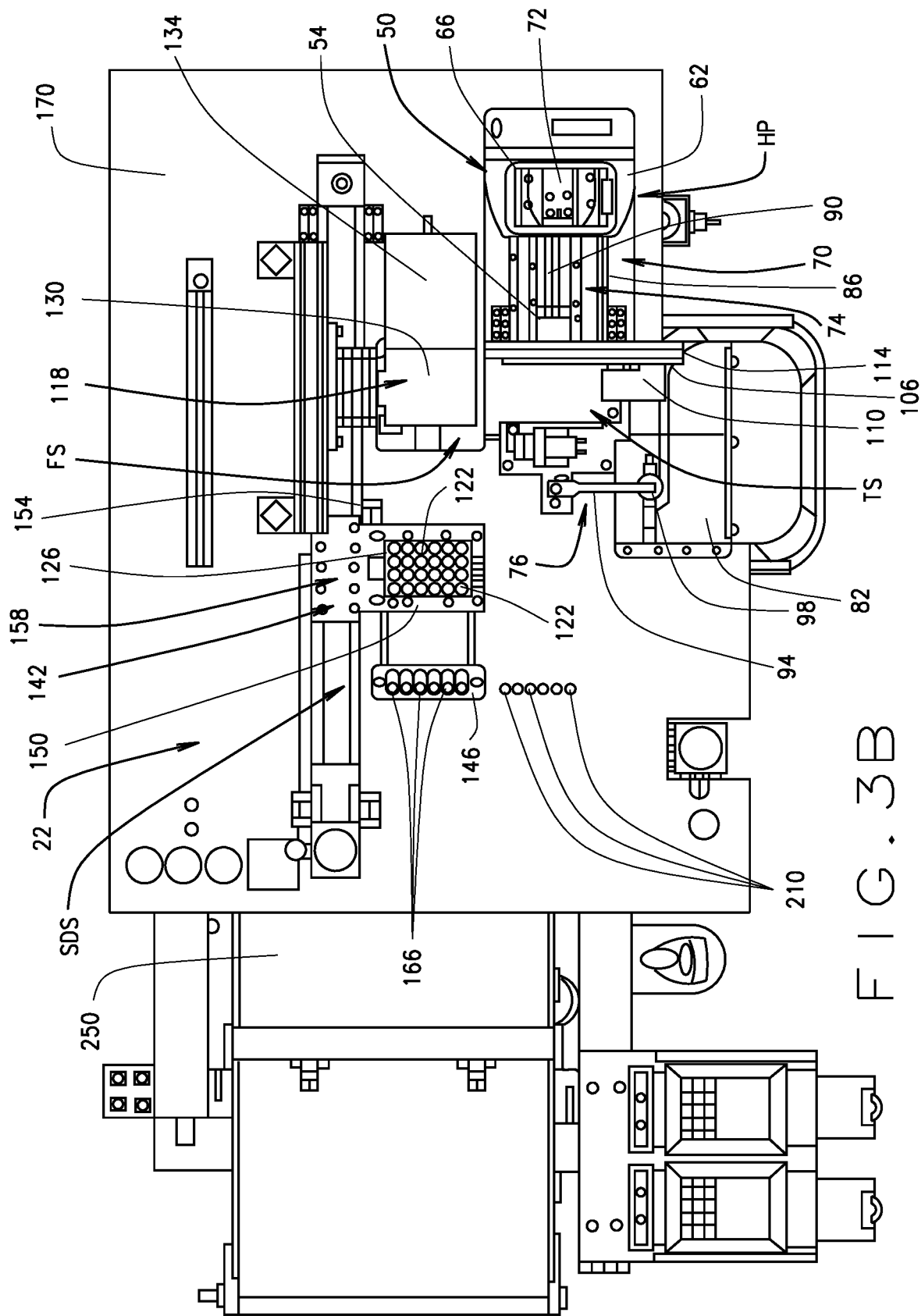
FIG. 3B is a top view of isometric view of the individual seed transfer subsystem of the high throughput seed handling system shown in FIG. 3A, in accordance with various embodiments of the present disclosure.

Referring now to FIGS. 1A and 1B, the present disclosure provides a high throughput seed handling system 10 that is structured and operable to receive a plurality of seeds (e.g., sampled seeds) having a known identity (e.g., at least one known genotypic and/or phenotypic characteristic or trait) and deposit the seeds into germination wells 42 of a germination tray 46 (see FIG. 2B), and track the identity of each seed throughout the process (e.g., from receipt of the seeds into the system 10 through deposition of the seeds into the germination tray 46). The system 10 generally includes an individual seed transfer subsystem 22 utilized when the system 10 is operated in an Individual Seed Mode, a bulk seed transfer subsystem 26 utilized when the system 10 is operated in a Bulk Seed Mode, a seed distribution subsystem 30, and a central control system (CCS) 32.

Generally, the individual seed transfer subsystem 22 is structured and operable to receive sets of individual seeds (e.g., a specific group or a specific plurality of seeds, e.g., sampled seeds) wherein each seed in a set is disposed in a respective one of a plurality of wells 34 of a seed storage tray 38 (see FIG. 2A), and transfer, transport, or otherwise convey the set of individual seeds to the seed distribution subsystem 30. Although the seed storage tray 38 is exemplarily illustrated in FIG. 2A as comprising 24 seed wells 34, it should be understood that the seed storage tray 38 can comprise any number of seed wells 34. Generally, the bulk seed transfer subsystem 26 is structured and operable to: receive a plurality of bulk seeds (e.g., a group or plurality randomly grouped seeds, e.g., sampled seeds) wherein the bulk seeds are disposed in a bulk container; singulate the seeds (e.g., separate or parse the bulk seeds into single seeds sets); and transfer, transport, or convey the singulated seeds to the seed distribution subsystem 30. Generally, the seed distribution subsystem 30 is structured and operable to receive the seeds from the individual seed transfer subsystem and the bulk seed transfer subsystem, and deposit each individual one of the received seeds into a respective one of a plurality of germination wells 42 of a seed germination tray 46 (see FIG. 2B), or any other desired receptacle, pot, planter, tray, cassette or envelope suited for reception of seeds The central control system (CCS) 32 is structured and operable to directly and/or indirectly control and coordinate all automated and cooperative functions and operations of the system 10, as described herein.

Referring now to FIGS. 1A, 1B, 2A, 2B 3A and 3B, FIGS. 3A and 3B exemplarily illustrate at least a portion of the individual seed transfer subsystem 22, wherein various structural support components (e.g., beams, struts, braces, etc.) of the system 10 have been removed to more clearly show the various components of the individual seed transfer subsystem 22. In various embodiments, the individual seed transfer subsystem 22 includes a seed storage tray dispenser 50 structured and operable to retain and dispense one or more seed storage tray 38, and at least one individual seed transfer subsystem identification tag reader 54 structured and operable to read an identification tag 58 on each seed storage tray 38 dispensed by the seed storage tray dispenser 50. The identification tag 58 on each seed storage tray 38 can be any tag or label suitable for providing various data and information regarding the respective seed storage tray 38 and/or the seeds stored in the respective wells 34 of the respective seed storage tray 38. For example, each identification tag 58 can be a radio frequency identification (RFID) tag, a one-dimensional (1D) barcode label, a two-dimensional (2D) barcode label, or any other suitable identification tag or label.

In various embodiments, the seed storage tray dispenser 50 includes a tray retention rack 62, a tray dispensing mechanism 66, and a seed storage tray shuttle 70. The tray retention rack 62 is structured and operable to retain one or more seed storage trays 38. For example, in various instances, the tray retention rack 62 can comprise a frame, duct or housing structured to retain one seed storage tray 38, or a column of a plurality of seed storage trays 38 stacked one on top of the other, therewithin. The tray dispensing mechanism 66 is structured and operable, as controlled by the CCS 32, to retain the seed storage trays 38 within the tray retention rack 62 and to dispense the seed storage trays 38 from within the tray retention rack 62 onto a tray platform 72 of the seed storage tray shuttle 70. Particularly, the tray dispensing mechanism 66 dispenses the seed storage trays 38, one-at-a-time such that the dispensed seed storage trays 38 are deposited onto the tray platform 72 located directly beneath the tray retention rack 62 in a Home position HP. In various instances, the tray shuttle 70 can include a lift-and-lower mechanism that is structured and operable to raise the tray platform 72 to retrieve each seed storage tray 38 from the tray retention rack 62. Particularly, in such instances, the lift-and-lower mechanism will raise the tray platform 72, as controlled by the CCS 32, such that when the tray dispensing mechanism 66 releases a seed storage tray 38 from the tray retention rack 62 the seed storage tray 38 will be disposed on the tray platform 72. The lift-and-lower mechanism will then lower the retrieved seed storage tray 38 to the Home position HP (e.g., the position directly beneath the tray retention rack 62).

Once a seed storage tray 38 is retrieved and disposed on the tray platform 72 in the Home position HP, the identification tag reader 54 will read the identification tag 58 on the respective seed storage tray 38. As described above, each respective identification tag 58 provides various data and information regarding the respective seed storage tray 38 and/or the seeds stored in the respective wells 34 thereof. For example, in various embodiments, the identification tag 58 of each seed storage tray 38 can identify the respective tray 38. The tray identity can then be cross referenced with seed storage information and/or data, via data storage tables stored with the CCS 32, to identify each seed stored in the wells 34 of the respective seed storage tray 38, and furthermore, which particular well 34 each seed is stored in, e.g., the X-Y coordinates of the respective well 34 in which each seed is stored within the respective storage tray 38. Hence, each seed stored within a retrieved storage tray 38, and the location of each seed within the retrieved storage tray 38, is identified. The tray shuttle 70 includes a transport mechanism 74 that is structured and operable to transport the tray platform 72, having the retrieved seed storage tray 38 disposed thereon, from the Home position HP to a transfer station TS. The transport mechanism 74 can be any device, mechanism, system, assembly, or apparatus that is structured and operable to move, transfer, convey, or transport, as controlled by the CCS 32, the tray platform 72 back and forth between the Home position HP and the transfer station TS. For example, in various embodiments, the transport mechanism 74 can comprise one or more track or rail 86 to which the tray platform 72 is slidingly engaged and a motor 90 (e.g., a pneumatic rodless cylinder or linear motor) that is structured and operable to move the tray platform 72 back and forth along the rail(s) 86 between the Home position HP and the transfer station TS.

In various embodiments, each seed storage tray 38 can include a lid 78, or other type of cover, for retaining the seeds within the wells 34 while the seed storage trays 38 are in storage. Alternative, each seed storage tray 38 can be stored and placed in the tray dispenser 50 without a lid or cover.

In the embodiments wherein each seed storage tray 38 includes a lid 78, the individual seed transfer subsystem 22 can further comprise a seed storage tray lid removing device 76 that is structured and operable to remove a lid 78 from (e.g., de-lid) each seed storage tray 38 transported to the seed storage tray transfer station TS, and in various instances deposit each lid 78 into a lid receptacle 82. More specifically, in various instances, each seed storage tray 38 can be covered by a lid 78, or other type of cover, to help retain the seeds within the tray wells 34. Accordingly, in such instances, when each seed storage tray 38 is dispensed from the tray retention rack 62 it will have a lid 78 disposed thereon. The lid 78 will then be removed by the lid removing device 76 once the respective seed storage tray 38 is transported to the transfer station TS. The lid removing device 76 can be any device suitable for removing the lids 78 from the seed storage trays 38, and in various instances depositing the removed lids 78 into the lid receptacle 82.

For example, in various instances, the lid removing device 76 can comprise a driven pivoting arm 94 (e.g., driven using a pneumatic actuator or a motor) having a lid grasping device 98 on a distal end thereof. The pivoting arm 94 can be pivoted, via control of CCS 32, to position the lid grasping device 98 over a seed storage tray 38 and lid 78 positioned at the transfer station TS. Either the pivoting arm 94 can be operable to move up and down, or the lid grasping device 98 can be operable to extend and retract such that once the lid grasping device 98 is positioned over the seed storage tray the lid grasping device 98 can be brought (e.g., lowered) into contact with the lid 78. Subsequently, the lid grasping device 98 can grasp the respective lid 78 and lift the lid 78 off, or otherwise remove the lid 78 from, the tray 38. In various embodiment, after the lid 78 has been removed, the pivoting arm 94 can be pivoted to position the removed lid 78 over the lid receptacle 82, at which point the lid grasping device 98 can release the lid 78 to allow the lid 78 to fall into a lid receptacle 82. The lid grasping device 98 can be any device, mechanism or apparatus controllable by the CCS 32 and suitable for grasping the lids 78, or other type of cover, such that the lids 78, or other type of cover, can be removed from the seed storage trays 38. For example, in various instances, the lid grasping device 98 can be a suction cup, a vacuum tip or cup, an electro-magnet, a robotic claw or hand, etc. In various embodiments, the lid receptacle 82 can be a closed bottom receptacle or bin for holding the removed lids 78. Or, alternatively in other embodiments the lid receptacle 82 can be a duct or chute that guides the removed lids 78 into a removable container, box, or bin placed adjacent a distal end of the lid receptacle 82, as exemplarily illustrated in FIG. 3A.

In the various embodiment wherein the seed storage trays 38 do not include the lid 78, or other type of cover, the transfer station TS will not include the lid removing device 76.

In various embodiments, the individual seed transfer subsystem 22 can further comprise at least one imaging device 102 structured and operable to capture image data of each seed storage tray 38 transported to the seed storage tray transfer station TS. More specifically, the imaging device(s) 102 is/are structured and operable to capture image data of the seed storage tray 38 and the seeds within the wells 34. Hence, in the instances wherein each seed storage tray is covered with a lid 78, the imaging device(s) 102 will capture image data of the seed storage tray 38 and the seeds within the wells 34 after the lid removing device 76 has removed the respective lid 78. The image data captured by the imaging device 102 can be analyzed via one or more image data analysis algorithm(s) executed by the CCS 32 to determine any desired information regarding the respective seed storage tray 38 and/or the seeds stored therein. For example, the image data can be analyzed to determine such things as, the state (e.g., empty or occupied by one or more seeds) of each well 34, the number of seeds in each well 34, the size and/or shape of the seeds in each well 34, the type of seeds in each well 34, the water and/or oil content of seeds in each well 34, etc. The imaging device(s) 102 can be any one or more and any combination of any desired imaging device(s). For example, the imaging device(s) 102 can be one or more, and any combination of, infrared (IR) camera, charge-coupled device (CCD) camera, magnetic resonance device, X-ray device, etc.

In various embodiments, the individual seed transfer subsystem 22 can further comprise a seed storage tray transfer device 106 that is structured and operable to transfer each seed storage tray 38 (e.g., each de-lidded seed storage tray 38) from the seed storage tray transfer station TS to a seed storage tray flipping station FS. The seed storage tray transfer device 106 can be any device, mechanism, system or assembly that is suitable to move, transfer, convey, or transport, as controlled by the CCS 32, the seed storage tray 38 (e.g., the de-lidded seed storage tray 38) from the transfer station TS to the seed storage tray flipping station FS. For example, in various instances, the seed storage tray transfer device 106 can comprise a push plate 110 that is connected to a motor 114 (e.g., a pneumatic rodless cylinder or linear motor) that is operable to move the push plate 110, as controlled by the CCS 32, from a position adjacent the seed storage tray transfer station TS to a position adjacent the seed storage tray flipping station FS. In such instances, the push plate 110 is located such that when the motor 114 moves the push plate 110 from the position adjacent the transfer station TS to the position adjacent the flipping station FS, the push plate 110 will push the respective seed storage tray 38 from the transfer station TS to the flipping station FS.

In various embodiments, the flipping station FS comprises a flipping table 118 that is structured and operable to receive each seed storage tray 38 transferred from the seed storage tray transfer station, confine and retain the seeds within the wells 34 in the seed storage tray 38, and invert each seed storage tray 38 such that the seeds in each well 34 fall into a corresponding cell 122 in a seed array tray 126 positionable beneath the flipping station FS. In various embodiments, the flipping table 118 comprises a tray bay 130 connected to an inverting motor or pneumatic actuator (not shown), and a sluice plate 134. The tray bay 130 is a bay or corral into which each respective seed storage tray 38 is disposed when the seed storage tray transfer device 106 moves the seed storage tray 38 from the transfer station TS to the flipping station FS. The sluice plate 134 is connected to a motor (e.g., a pneumatic rodless cylinder or linear motor, or other motive device) 138 that is operable, as controlled by the CCS 32, to position the sluice plate over the top of each respective seed storage tray 38 to cover the seed storage tray wells 34 and thereby confine and retain the seeds within the respective seed storage tray wells 34.

The seed array tray 126 is removably mounted to an array tray shuttle 142 that is structured and operable to shuttle the seed array tray 126 between a seed transfer position located beneath the flipping station FS and a seed distribution station SDS located above a multi-funnel block 146 of the seed distribution subsystem 30. The array tray shuttle 142 comprises a tray platform 150 to which the seed array tray 126 is removably mounted, and a linear motor (e.g., a pneumatic rodless cylinder or linear motor or other motive device) 154 that is operable, as controlled by the CCS 32, to shuttle or move the seed array tray 126 between the seed transfer position and the seed distribution station SDS.

In operation, once a seed storage tray 38 has been moved by the seed storage tray transfer device 106 into the tray bay 130 of the flipping table 118, the CCS 32 will move the sluice plate 134 over the seed storage tray 38, thereby confining and retaining the seeds within the respective seed storage tray wells 34, and retaining the respective seed storage tray 38 within the flipping station tray bay 130. In various instances, the system also comprises a actuator to hold the seed storage tray 38 in position within the tray bay 130, so that the seed storage tray 38 does not fall on top of the seed array tray 126 when the sluice plate 134 is in an Open position. Next the inverting motor will invert the tray bay 130 and sluice plate 134, and consequently the seed storage tray 38 within the tray bay 130. Prior to or subsequent to the inversion of the tray bay 130, sluice plate 134 and seed storage tray 38, the array tray shuttle 142 will position the seed array tray beneath the flipping station FS. More specifically, the CCS 32 controls the positioning of the seed array tray beneath the flipping station FS such that each well 34 in the respective seed storage tray 38 will be adjacent and substantially aligned with a respective one of the cells 122 in the seed array tray 126 after the seed storage tray 38 has been inverted.

Figure 5A:
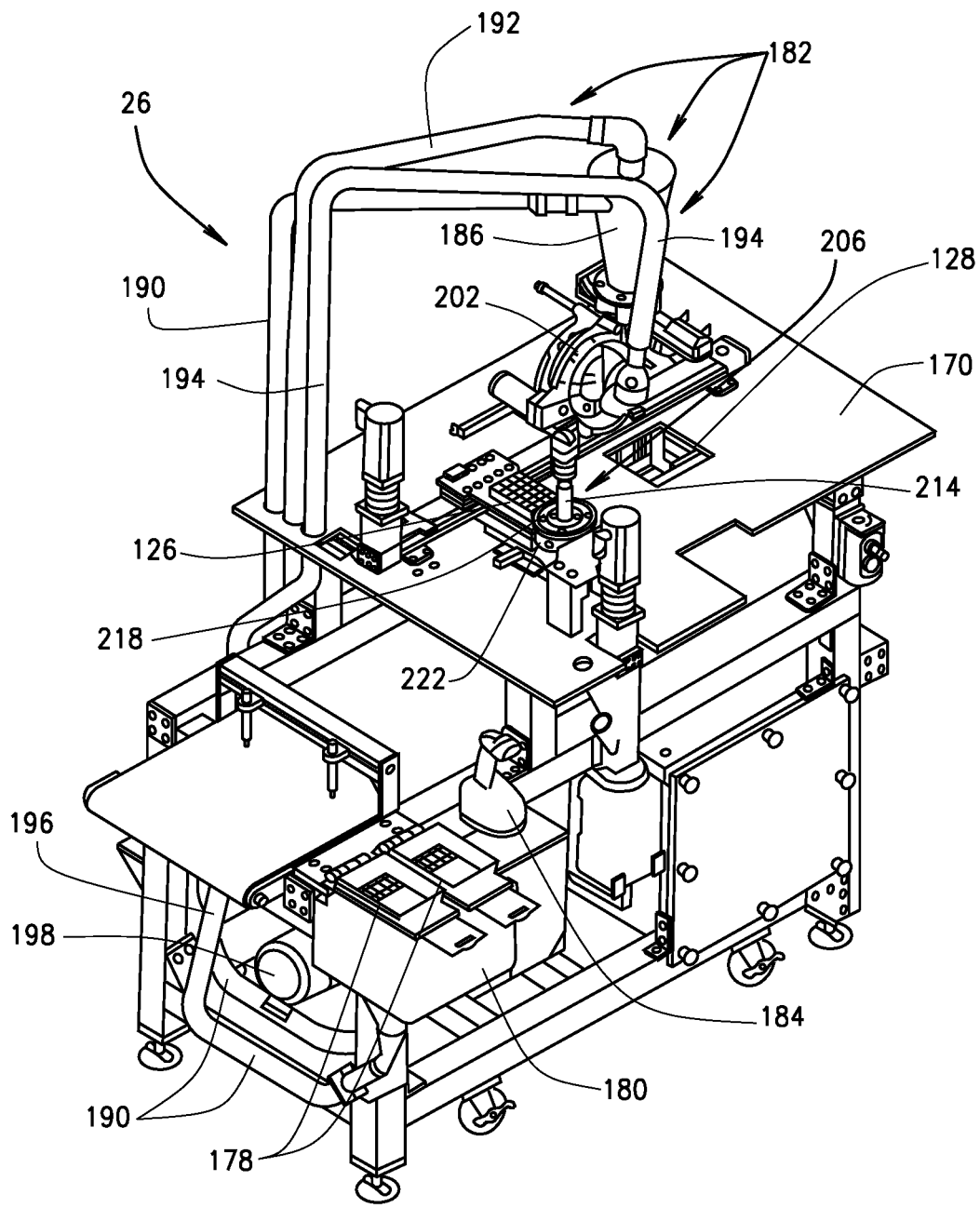
FIG. 5A is an isometric view of the bulk seed transfer subsystem of the high throughput seed handling system shown in FIGS. 1A and 1B, having various structural components of the system removed, in accordance with various embodiments of the present disclosure.
Figure 5B:
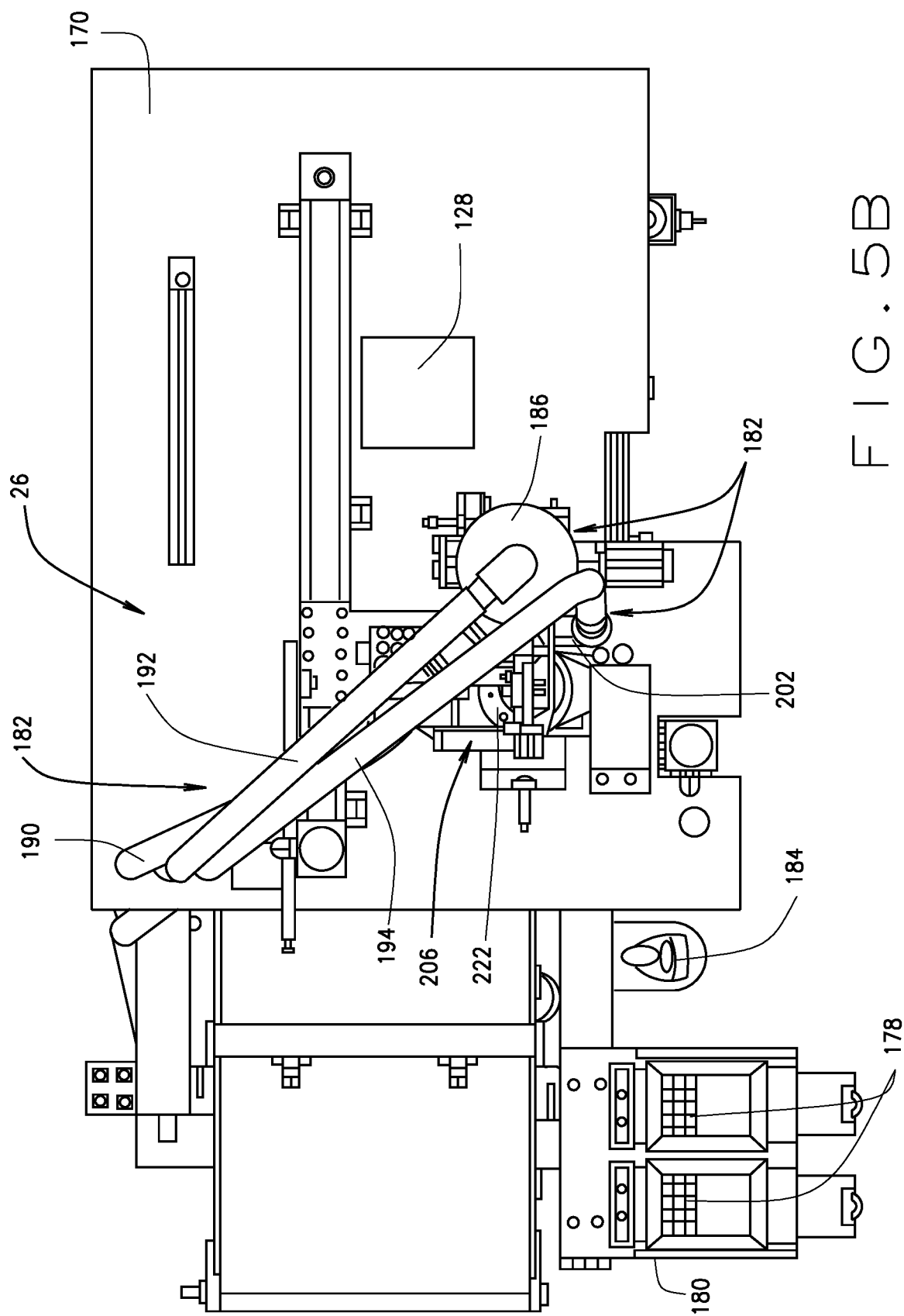
FIG. 5B is a top view of the bulk seed transfer subsystem of the high throughput seed handling system shown in FIG. 5A, in accordance with various embodiments of the present disclosure.

Once the seed storage tray 38 has been inverted, and the seed array tray 126 has been positioned beneath the flipping station FS such that each well 34 in the respective seed storage tray 38 is adjacent and substantially aligned with a respective one of the cells 122 in the seed array tray 126, the sluice plate 134 is moved, as controlled by the CCS 32, to uncover the wells 34 of the seed storage tray 38, thereby allowing the seeds in each seed storage tray well 34 to fall into the corresponding adjacent array tray cell 122. Importantly, the known identity and location of each seed disposed within the respective seed storage tray 38 is tracked, translated and maintained when the seeds are transferred to the array tray 126 such that the identity and location of each seed disposed within the array tray 126 is known. Thereafter, the seed storage tray 38 will be released from the tray bay 130 and allowed to fall into a tray discard chute 128 (see FIGS. 5A and 5B).

As described above the array tray 126 comprises a plurality of cells 122 and is removably mounted to the array tray shuttle 142. The array tray cells extend through the array tray 126 such that each cells 122 is open at both ends (e.g., the top and bottom of each cell 122 is open). The array tray shuttle comprises a frame 158 and defines an array frame aperture (not shown) that is approximately the same size as, but slightly smaller than the outer dimensions of the seed array tray 126, and a sluice plate 162 that is controllably movable, as controlled by the CCS 32, between a Closed and an Open position to cover and uncover portions of, or all of, the array frame aperture. Particularly, when the seed array tray 126 is positioned beneath the flipping station FS, and as the seed array tray is being moved from beneath the flipping station FS to the seed distribution station SDS, the array tray shuttle sluice plate 162 is in the Closed position, thereby covering the array frame aperture and providing a bottom to the seed array tray cells 122.

Figure 4A:
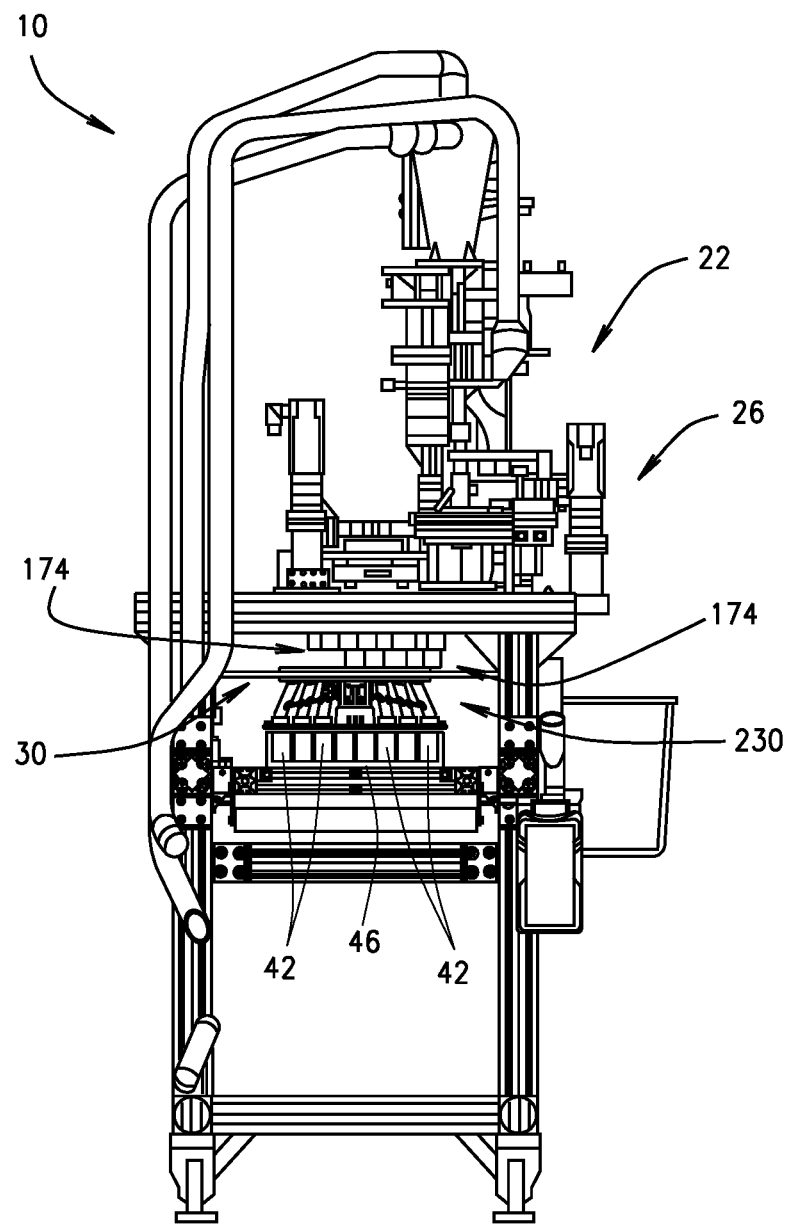
FIG. 4A is an end view of the high throughput seed handling system shown in FIG. 1A illustrating seed distribution subsystem thereof, in accordance with various embodiments of the present disclosure.
Figure 4B:
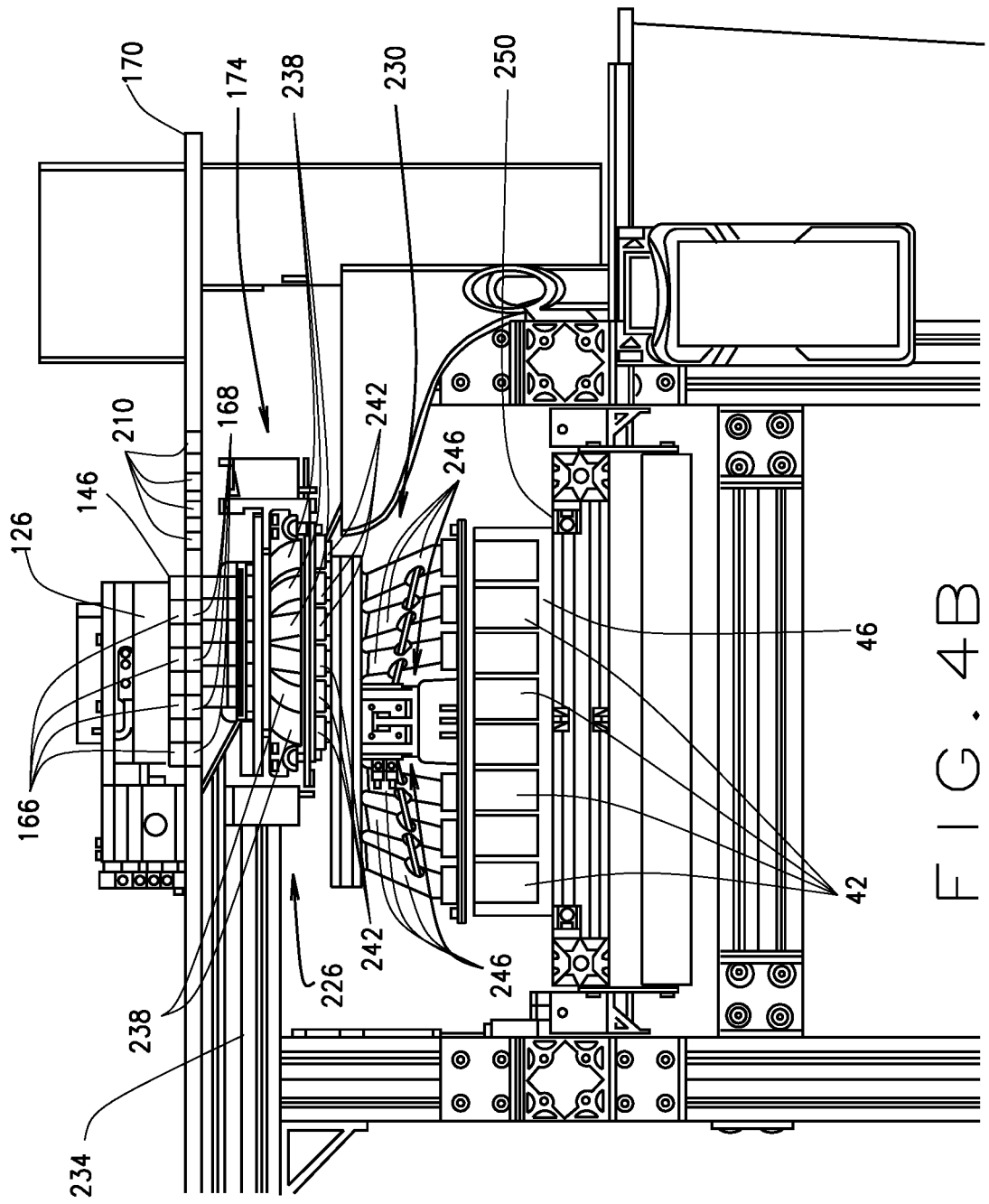
FIG. 4B is a cross-sectional view of the high throughput seed handling system shown in FIG. 4A illustrating the seed distribution subsystem in greater detail, in accordance with various embodiments of the present disclosure.

The multi-funnel block 146 comprises a plurality of funnels 166 that extend through the multi-funnel block 146 and are open at opposite ends. In various instances, the number of funnels 166 in the multi-funnel block 146 is equal to the number of cells 122 in each row of cells 122 of the seed array tray 126. The multi-funnel block 146 is mounted to the table top 170 of the system 10 such that an open end of each funnel 166 aligns with a respective one of a plurality of seed passage holes 168 (see FIG. 4B) that extend through the table top 170. As described above, when the seed array tray 126 is moved to the seed distribution station SDS, the array tray shuttle 142 and seed array tray 126 mounted thereon is positioned above the multi-funnel block 146.

After the seeds have been transferred from the seed storage tray 38 to the seed array tray 126, and the seed array tray 126 is moved to the seed distribution station SDS, the CCS 32 positions the array tray shuttle 142 such that each array tray cell 122 in a first row of the array tray cells 122 is adjacent and approximately aligned with a respective one of the funnels 166 in the multi-funnel block 166. Subsequently, the CCS 32 moves the array tray sluice plate 162 to expose the open ends of the first row of array tray cells 122, thereby allowing the respective seeds within the exposed cells 122 to fall into the respective funnels 166, which direct the seeds through the seed passage holes 168 in the table top 170 and into a seed distribution shuttle 174 of the seed distribution subsystem 30 disposed under the table top 170 (See FIGS. 4A and 4B), whereafter the seed distribution shuttle 174 distributes the seeds, as described below. Once the first row of seeds has been dispersed from the seed array tray 126, the CCS 32 moves the array tray shuttle to substantially align a second row of seed array tray cells 122 with the funnels 166 of the multi-funnel block 146 and the array tray sluice plate 162 is moved to expose the open end of the second row of array tray cells 122, thereby allowing the respective seeds within the exposed cells 122 to fall into the respective funnels 166, which direct the seeds through the seed passage holes 168 in the table top 170 into the seed distribution shuttle 174 disposed under the table top 170. This process is repeated until all the seeds in the seed array tray 126 have been distributed, as described below.

It is envisioned that in various embodiments, the seed distribution subsystem 30 can comprise one or more system, apparatus, device, or mechanism that is structured and operable to obtain pre and post imaging of the seed germination tray 46. Pre-imaging would insure no seed presence within any of the germination wells 42 and could measure soil/media characteristics such as moisture, dibble location/depth/width/profile, media height, spectral signature for constituent quantification. Post-imaging would confirm seed presence in desired ones of the germination wells 42, measure soil/media characteristics, and also measure seed+ soil/media characteristics, such as planting depth and seed orientation.

Referring now to FIGS. 1A, 1B, 2B, 3A, 3B, 4A and 4B, in various embodiments the seed distribution subsystem 30 comprises the seed distribution shuttle 174 that is mounted to a distribution shuttle transport mechanism 226, and a drop tube assembly 230 fixedly mounted below the seed distribution shuttle 174. The distribution shuttle transport mechanism 226 can comprise a track or rail 234 and a linear motor (e.g., a pneumatic rodless cylinder or linear motor) (not shown) that is structured and operable to move the seed distribution shuttle 174 back and forth along the track 234, as controlled by the CCS 32. In various implementations, the seed distribution shuttle 174 comprises a plurality of diverter tubes 238 that are equal in number to, and aligned and spaced apart such that their upper or proximal ends have the same spacing and configuration as, the seed passage holes 168 and the seed passage orifices 210 (described below) in the table top 170. Therefore, the distribution shuttle transport mechanism 234, as controlled by the CCS 32, can selectively align the upper ends of the diverter tubes 238 with the seed passage holes 168 when the high throughput seed handling system 10 is operating in the Individual Seed Mode, and with the seed passage orifices 210 when the high throughput seed handling system 10 is operating in the Bulk Seed Mode.

The seed distribution shuttle 174 additionally comprises a plurality of diverter tube portals 242. Each diverter tube portal 242 is disposed at, and fluidly connected to, the lower or distal end of a respective one of the diverter tubes 238. Each diverter tube portal 242 is structured and operable to transition, as controlled by the CCS 32, between a Closed position wherein the lower end of the respective diverter tube 238 is blocked or closed, and an Open position wherein the lower end of the respective diverter tube 238 is unblocked or open. The drop tube assembly 230 comprises a plurality of drop tubes 246 that are equal in number to the number of wells 42 in one row of the germination tray 46. The drop tubes 246 are arranged and spaced apart such that, via movement of the distribution shuttle 174 as controlled by the CCS 32 along the distribution shuttle transport mechanism track 234, the upper or proximal ends of the drop tubes 246 can be aligned with the diverter tube portals 242. The drop tubes 246 are further arranged and spaced apart such that the lower or distal end of each drop tube 246 will align with a respective one of the germination tray wells 42 in a row of wells 42 when a germination tray 46 is positioned under the drop tube assembly 230. In various embodiments, it is envisioned that each drop tube 246 can align with a respective one of any other desired seed receptacle such as a plurality of ellepots, envelopes, cassette cells, or other desired receptacle. In various embodiments, the germination tray 46 (or other type of seed receptacles) can be automatically positioned under the drop tube assembly 230 via operation, as controlled by the CCS 32, of a conveyor 250 of the system 10.

As described above, when operating in the Individual Seed Mode, the individual seed transfer subsystem 22 is structured and operable to selectively deposit the seeds from each seed storage tray 38 into the seed distribution shuttle 174, while maintaining and tracking the identity of each respective seed throughout the process. More specifically, the individual seed transfer subsystem 22 is structured and operable to deposit each seed from the first row of the seed storage tray 38 into a respective one of the diverter tubes 238, whereafter each respective seed is deposited into a selected one of the germination tray wells 42 as described below, whereafter the process is repeated for each of the remaining rows of seeds in the respective seed storage tray 38. And, thereafter, the process is repeated for each seed storage tray 38 deposited in the tray retention rack 62.

More particularly, when the open ends of the first row of array tray cells 122 are exposed to allow each of the transferred seeds therein to fall into the funnels 166, through the seed passage holes 168, and into a respective one of diverter tubes 238, the CCS 32 places the diverter tube portals 242 in the Closed position such that each seed is temporarily captured within the respect diverter tube 238. Once each seed from a row of array tray cells 122 has been deposited and captured within a respective one of the distribution shuttle diverter tubes 238, the distribution shuttle transport mechanism 226, as controlled by the CCS 32, will move the distribution shuttle 174 along the distribution shuttle transport mechanism track 234 to position all or selected one(s) of the diverter tube portals 242 over the upper ends of selected one(s) of the drop tubes 246. More specifically, the CCS 32 will position all or selected one(s) of the diverter tube portals 242 over the upper ends of selected one(s) of the drop tubes 246 whose lower ends are positioned above selected ones of the germination tray wells 42 in a selected row of wells 42 of the germination tray 46 (or other type of seed receptacles). Once the distribution shuttle 174 is selectively positioned by the CCS 32, the CCS 32 will open the diverter tube portals 242 of all or selected one(s) of the diverter tubes 238 such that the respective seed(s) captured therein will fall into and through the respective drop tube(s) 246, whereby the respective drop tube(s) 246 direct the seed(s) into the selected well(s) 42 of the selected row of wells 42 in the germination tray 46 (or other type of seed receptacles). In various instances each well 42 of the germination tray 46 can be at least partially filled with a growing medium (e.g., soil) prior to depositing the seeds therein.

As described above, in various embodiments, the germination tray 46 (or other type of seed receptacles) can be automatically positioned under the drop tube assembly 230 via operation of the conveyor 250. Moreover, the CCS 32 can control operation of the conveyor 250 to move the germination tray 46 (or other type of seed receptacles) back and forth along the conveyor 250 to position selected rows of wells 42 under the drop tubes 246. Therefore, movement of and positioning of the germination tray 46 (or other type of seed receptacles) can be coordinated with movement and operation of the seed distribution shuttle 174 to deposit selected seeds having known identities in selected wells 42 of the germination tray 46 (or other type of seed receptacles). Additionally, in various embodiments, the germination tray 46 (or other type of seed receptacles) can include an identification tag 254 similar to the seed storage tray identification tag 58. In such instances, the germination tray identification tag 254 on each germination tray 46 (or other type of seed receptacles) can be any tag or label suitable for providing various data and information regarding the respective germination tray 46 (or other type of seed receptacles) and/or the seeds to be deposited in the respective wells 42 of the respective germination tray 46 (or other type of seed receptacles). For example, each germination tray identification tag 254 can be a radio frequency identification (RFID) tag, a one-dimensional (1D) barcode label, a two-dimensional (2D) barcode label, or any other suitable identification tag or label. In such instances, the germination tray identification tag 254 would be scanned by a suitable identification tag reader such as or similar to identification tag reader 184, described below.

It is envisioned that seed distribution shuttle 174 and/or drop tube assembly 230 are removable and can be interchanged with other size, shape and configuration seed distribution shuttles 174 and/or drop tube assemblies 230 to accommodate size, shape and configuration of the respective seed storage trays 38 and or germination tray 46.

Referring now to FIGS. 1A, 1B, 5A, 5B and 5C, FIGS. 5A, 5B and 5C exemplarily illustrate at least a portion of the bulk seed transfer subsystem 26, wherein various structural support components (e.g., beams, struts, braces, etc.) of the system 10 have been removed to more clearly show the various components of the bulk seed transfer subsystem 26. In various embodiments, the bulk seed transfer subsystem 26 includes one or more bulk seed receptacle 178 that is/are fluidly connected to a vacuum operated seed transfer system 182. Although the bulk seed transfer subsystem 26 will be exemplarily described herein as utilizing a vacuum to transport the seeds through the bulk seed transfer subsystem 26, it is envisioned that other method and/or means for transporting the seeds through the bulk seed transfer subsystem 26 can be utilized and remain within the scope of the present disclosure.

In various instances, wherein the bulk seed transfer subsystem 26 includes a plurality of bulk seed receptacles 178, two or more of the bulk seed receptacles 178 can be fluidly connected to one of at least one bulk seed funnel 180 that is/are fluidly connected to the vacuum operated seed transfer system 182. The bulk seed receptacle(s) 178 is/are structured and operable to receive a group of a plurality of bulk seeds wherein all seeds in the group have the same known identity (e.g., at least one known genotypic and/or phenotypic characteristic or trait). In various instances, the bulk seed transfer subsystem 26 further includes at least one bulk seed transfer subsystem Identification tag reader 184 that is structured and operable to read an identification tag (not shown) on a bulk seed container (not shown) from which the group of bulk seeds is dispensed into the bulk seed receptacle(s) 178. The identification tag on each bulk seed container can be any tag or label suitable for providing various data and information regarding the respective seeds disposed within the respective bulk seed container. For example, each identification tag 58 can be a radio frequency identification (RFID) tag, a one-dimensional (1D) barcode label, a two-dimensional (2D) barcode label, or any other suitable identification tag or label.

The vacuum operated seed transfer system 182 comprises a seed decelerator 186, at least one seed transport conduit, tube or pipe 190 connected to a top portion of the decelerator 186, at least one singulator vacuum conduit, tube or pipe 194 connected to a seed singulator 202, and a vacuum generation system 196. In various embodiments, the vacuum operated seed transfer system 182 can additionally include an air removal tube 192 connected to the top portion of the decelerator 186. The seed transport conduit(s) 190 is/are connected at one end to bulk seed receptacles 178 (in various instances via the bulk seed funnels(s) 180) and at an opposing end to the seed decelerator 186. The singulator vacuum conduit(s) 194 is/are connected at one end to an air/vacuum tank 198 of the vacuum generation system 196 and at an opposing end to an air outlet of the seed singulator 202 of the bulk seed transfer subsystem 26. The vacuum generation system 196 (e.g., the air/vacuum tank 198) is operable to generate a vacuum in the seed transport conduit(s) 190 and the vacuum conduit(s) 190 that is used to transport seeds from the respective bulk seed receptacle 178 (e.g., from the bulk seed funnel(s) 180) to the seed decelerator 186. The air removal tube 192 is also connected to an air filtration system, whereby air can be removed from the seed decelerator 186 to allow the seeds transported to the seed decelerator 186 to fall to the bottom of the decelerator 186, as described below.

As described above, the bulk seed transfer subsystem 26 further includes the seed singulator 202 that is structured and operable to receive from the seed decelerator 186 the group of bulk seeds transferred from the bulk seed receptacle(s) 178 and parse single seeds from the transferred group(s) of bulk seeds. In various embodiments, the seed decelerator 186 can have a funnel shape and the seeds can be fed into the seed feeder such that the seeds are caused to swirl around the wall of the funnel shaped seed decelerator 186 and decelerate as the seeds fall to the bottom of the funnel 186. This prevents the seed from bridging, jamming and/or clogging up at the bottom outlet of the funnel where the seeds are feed into the seed singulator 202. The seed singulator 202 is structured and operable to receive the group(s) of bulk seeds from the seed decelerator 180 and parse or separate single seeds from the group(s) of bulk seeds. The seed singulator 202 can be any device structure and operable to parse or separate single seeds one-by-one from a group of seeds at a high throughput rate, such as the singulator described in U.S. patent application Ser. No. 13/000,961, filed on Feb. 18, 2011, incorporated herein by reference in its entirety.

In various embodiments, the bulk seed transfer subsystem 26 further includes a seed indexer 206 that is structured and operable, as controlled by the CCS 32, to receive each singulated seed from the seed singular 202 and direct each respective seed into and through a respective selected one of a plurality of seed passage orifices 210 (see FIGS. 3A, 3B and 4B) in the table top 170. The seeds pass through the seed passage orifices 210 and into the seed distribution shuttle 174 of the seed distribution subsystem 30 disposed under the table top 170, whereafter the seed distribution shuttle 174 distributes the seeds, as described below.

The seed indexer 206 can be any device suitable for receiving the singulated seeds from the seed singular 202 and directing each respective seed into and through a respective one of the seed passage orifices 210. For example, in various instances, the seed indexer 206 can be a rotating device having a hollow central column that receives, one-at-a-time, each singulated seed from the singulator 202. In such instances, the seed indexer 206 additionally includes a hollow finger tube 218 that is fluidly connected to the hollow central column 214 such that seeds deposited into the central column 214 by the singulator 202 will travel through the central column 214, and then into and through the finger tube 218. The finger tube 218 is offset from a longitudinal axis of the central column 214 such that seeds passing therethrough will be directed to and through an aperture (not shown) in an outer circumferential area of a disc shaped indexing plate 222. The indexer 206 is operable, as controlled by the CCS 32, to rotate the central column 214, finger tube 218 and the indexing plate 222 as a single unit such that when the singulator 202 deposits a seed into the central column 214 the aperture in the indexing plate will be aligned with a selected one of the seed passage orifices 210 on the table top 170. Accordingly, the seed will pass through the central column 214, the figure tube 218, and the aperture in the indexing plate 222, be directed into and through the selected seed passage orifice 210 and be deposited into the distribution shuttle 174. Subsequently, the indexer 206 will incrementally rotate the central column 214, finger tube 218, and the indexing plate 222 as a single unit to align the aperture in the indexing plate 222 with another selected one of the seed passage orifices 210 in the table top 170 (i.e., not the same orifice 210 as the immediately prior orifice 210). Therefore, as each subsequent seed is dispensed by the singulator 202, each respective seed will be sequentially directed through a respective selected one of the seed passage orifices 210. In various embodiments, bulk seed transfer subsystem 26 can include a sluice gate (not shown) disposed under the indexing plate 222 so that one set of seeds can be distributed into the distribution shuttle 174 while a second set of seed can be parsed by singulator 202 and deposited into the apertures of the indexing plate 222.

Referring now to FIGS. 1A, 1B, 2B, 3A, 3B, 5A, 5B and 5C, as described above, when operating in the Bulk Seed Mode, the bulk seed transfer subsystem 26 is structured and operable to singulate seeds from groups of pluralities of bulk seed having a known identity and selectively deposit the singulated seeds into the seed distribution shuttle 174. More specifically, the bulk seed transfer subsystem 26 is structured and operable to deposit a group of singulated seeds (a group of singulated seeds comprising 1 or more singulated seed, e.g., 1-12 singulated seeds, e.g., 6 seeds) into a respective one of the diverter tubes 238, whereafter each respective seed is deposited into a selected one of the germination tray wells 42 (or other type of seed receptacles) as described below, whereafter the process is repeated for subsequent groups of singulated seeds.

More particularly, when the seed indexer 206 deposits as seed from the singulator 202 into each of the seed passage orifices 210, and into a respective one of diverter tubes 238, the CCS 32 places the diverter tube portals 242 in the Closed position such that each seed is temporarily captured within the respect diverter tube 238. Once each seed from a group of singulated seeds (e.g., 1-12 singulated seeds) has been deposited and captured within a respective one of the distribution shuttle diverter tubes 238, the distribution shuttle transport mechanism 226, as controlled by the CCS 32, will move the distribution shuttle 174 along the distribution shuttle transport mechanism track 234 to position all or selected one(s) of the diverter tube portals 242 over the upper ends of selected one(s) of the drop tubes 246. More specifically, the CCS 32 will position all or selected one(s) of the diverter tube portals 242 over the upper ends of selected one(s) of the drop tubes 246 whose lower ends are positioned above selected ones of the germination tray wells 42 in a selected row of wells 42 of the germination tray 46 (or other type of seed receptacles). Once the distribution shuttle 174 is selectively positioned by the CCS 32, the CCS 32 will open the diverter tube portals 242 of all or selected one(s) of the diverter tubes 238 such that the respective seed(s) captured therein will fall into and through the respective drop tube(s) 246, whereby the respective drop tube(s) 246 direct the seed(s) into the selected well(s) 42 (or other type of seed receptacles) of the selected row of wells 42 in the germination tray 46. In various instances each well 42 of the germination tray 46 (or other type of seed receptacles) can be at least partially filled with a growing medium (e.g., soil) prior to depositing the seeds therein.

As described above, in various embodiments, the germination tray 46 (or other type of seed receptacles) can be automatically positioned under the drop tube assembly 230 via operation of the conveyor 250. Moreover, the CCS 32 can control operation of the conveyor 250 to move the germination tray 46 (or other type of seed receptacles) back and forth along the conveyor 250 to position selected rows of wells 42 (or other type of seed receptacles) under the drop tubes 246. Therefore, movement of and positioning of the germination tray 46 (or other type of seed receptacles) can be coordinated with movement and operation of the seed distribution shuttle 174 to deposit selected seeds in selected wells 42 of the germination tray 46 (or other type of seed receptacles).

Figure 6:
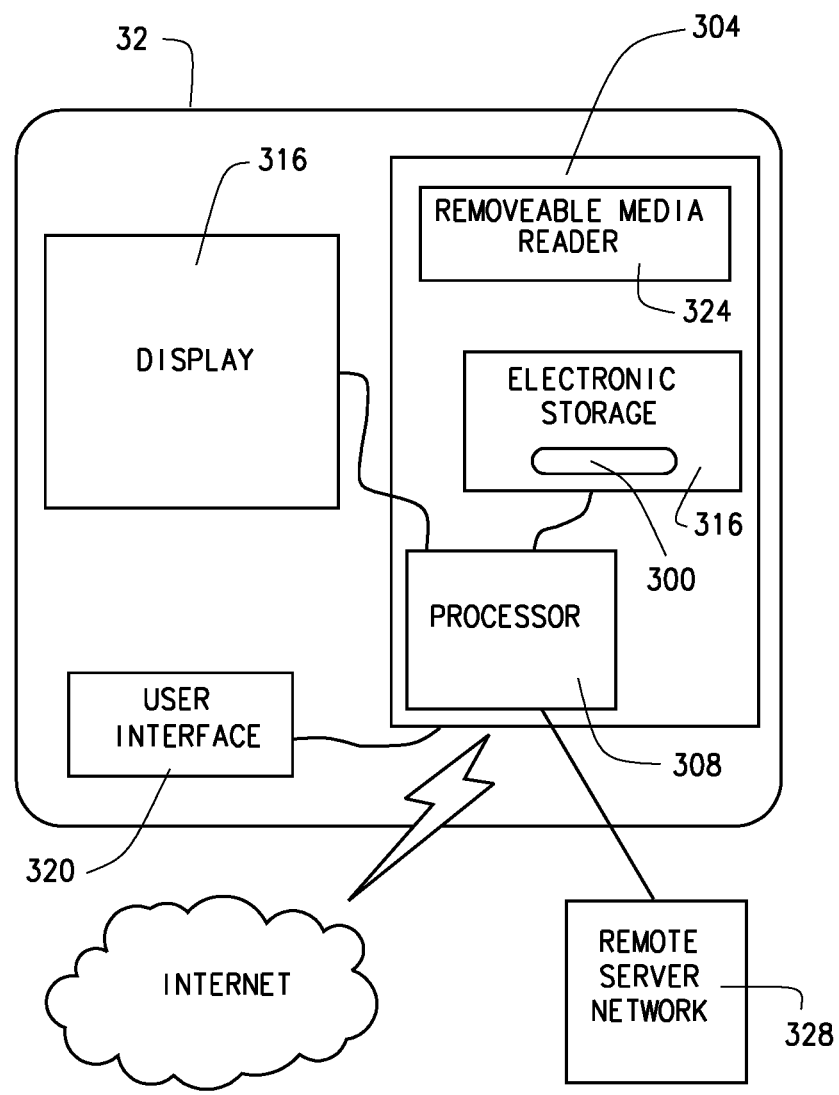
FIG. 6 is a block diagram of a central controls system of the high throughput seed handling system shown in FIG. 1A, in accordance with various embodiments of the present disclosure.

Referring now to FIG. 6, as described above, high throughput seed handling system 10 is controlled by the central control system (CCS) 32, and more particularly by execution of various high throughput seed handling system software, programs, algorithms, and/or code, illustrated in FIG. 6 by reference numeral 300 executed by at least one processor of the CCS 32. In various embodiments, the CCS 32 can include various computers, controllers, programmable circuitry, electrical modules, etc. that can be located at various locations of the high throughput seed handling system 10. Particularly, in various embodiments, the CCS 32 is a computer based system that can include one or more computers and/or computer based modules 304 that each include at least one processor 308 suitable to execute the various software, programs, algorithms, and/or code that control all automated functions and operations of the high throughput seed handling system 10, as described herein. Each computer and/or computer based module 304 can additionally include at least one electronic storage device 312 that comprises a computer readable medium, e.g., non-transitory, tangible, computer-readable medium, such as a hard drive, erasable programmable read-only memory (EPROM), electronically erasable programmable read-only memory (EEPROM), read-write memory (RWM), etc. Other, non-limiting examples of the non-transitory, tangible, computer-readable medium are nonvolatile memory, magnetic storage, and optical storage. Generally, the computer readable memory can be any electronic data storage device for storing such things as the various software, programs, algorithms, code, digital information, data, look-up tables, spreadsheets and/or databases, etc., used and executed during operation of the high throughput seed handling system 10, as described herein.

Furthermore, in various implementations, the CCS 32 can include at least one display 316 for displaying such things as information, data and/or graphical representations, and at least one user interface device 320, such as a keyboard, mouse, stylus, and/or an interactive touch-screen on the display 316. In various embodiments, some or all of the computers and/or computer based modules 304 can include a removable media reader 324 for reading information and data from and/or writing information and data to removable electronic storage media such as floppy disks, compact disks, DVD disks, zip disks, flash drives or any other computer readable removable and portable electronic storage media. In various embodiments the removable media reader 324 can be an I/O port of the respective computer or computer based module 304 utilized to read external or peripheral memory devices such as flash drives or external hard drives.

In various embodiments, the CCS 32, e.g., one or more of the computers and/or computer based modules 304, can be communicatively connectable to a remote server network 328, e.g., a local area network (LAN), via a wired or wireless link. Accordingly, CCS 32 can communicate with the remote server network 328 to upload and/or download data, information, algorithms, software programs, and/or receive operational commands. Additionally, in various embodiments, the CCS 32 can be structured and operable to access the Internet to upload and/or download data, information, algorithms, software programs, etc., to and from Internet sites and network servers. In various embodiments, the various high throughput seed handling system software, programs, algorithms, and/or code executed by the processor (s) 308 to control the operations of the high throughput seed handling system 10 can be top-level system control software that not only controls the discrete hardware functionality of the high throughput seed handling system 10, but also prompts an operator for various inputs.

Although the high throughput seed handling system 10 has been described above in accordance with various exemplary embodiments, the present disclosure should not be so limited. For example, it is envisioned that in various instances all relevant steps executed by the system 10 with regard to the Individual Seed Mode can enabled via the use of robotics, particularly the picking, transferring, and scanning steps. For example, it is envisioned that one or more robotic arms that can simultaneously scan a machine-readable code attached to and/or associated with a seed or any container the seed is in/on at some point before, during, or after the arm executes a transfer of a seed or any container the seed is in/on.

Additionally, it is envisioned that the system 10 can be utilized with any type of seed, species of plant, or seed treatment/coating. Even very small seeds (e.g. canola, wheat, etc.) could be used with the system 10, for example, by the use of different seed coatings and/or the use of seed pelleting techniques.

Furthermore, although the system 10 has been described above as executing various high throughput seed handling system software, programs, algorithms, and/or code, the system 10 should be limited to executing any particular set of instructions or limited to generating any arrangement of seeds. The seeds can be selected and transferred from one step to the next in any order the user desires. For example, a user may decide that among the seeds that will be advanced to the next step, there are seeds that are most valuable of all, and those should be arranged in the germination tray 46 in a certain order relative to other seeds that are also selected for advancement to the next stage in the process. Accordingly, in various instances, the system 10 can prioritize seeds fed into downstream steps in any way desired.

As described above, in exemplary embodiments, each seed storage tray 38 can include a lid 78, or other type of cover, for retaining the seeds within the wells 34 while the seed storage trays 38 are in storage. It is envisioned that the system 10 can be capable of covering/uncovering the seed storage tray(s) 38 without specifically using lids, for example, it is envisioned that the system 10 can include and utilize reusable slide plates or belts that temporarily cover the top of a lid during a transfer, and then lift off and move back to cover the next plate after the transfer is completed.

As described above, although the system 10 has been exemplarily described above to deposit the seeds into well 42 of the seed germination tray 46, it is envisioned that the system 10 can be structured and operable to deposit the seed into any desired receptacle, e.g. any receptacle capable of keeping the seeds separate from one another. In one example, the distribution shuttle 174 can be structured and operable deposit the seeds directly into small, individual ellepots that are not actually part of a tray.

It should be understood that although the various high throughput seed handling system software and algorithms control operations and functionality may be described herein as being implemented or carried out by the CCS 32, it will be appreciated that in some embodiments the CCS 32 may indirectly perform and/or control performance of such operations and functionality by generating commands and control signals that can cause other elements to carry out the control operations and functionality described herein. For example, it is the execution of the software by one or more processor of the CCS 32 that can generate the commands that control the high throughput seed handling system 10 that are then output by the CCS 32 to implement the various operations and functions as described herein.

The high throughput seed handling system 10 described herein is structured and operable track the identity of each individual seed through the entire breeding process, for the life of plant from seed, to seedling, to plant. More specifically, the system 10 will permit planting seeds at high throughput rate without any manual association of seed identity from source container to destination container. For example, the system 10 and associated software enable verifications that allow users to plant pollination groups or sets with prescribed grouping and order, which can help reduce complexity and resources in downstream processes. It allows planting both bulk seeds and identified seeds into any configuration of germination trays.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A high throughput system for depositing seed into seed receptacles, said system comprising:
   a seed distribution subsystem;
   an individual seed transfer subsystem structured and operable to transfer individual seeds from wells in a seed storage tray to the seed deposition subsystem;
   a bulk seed transfer subsystem structured and operable to singulate a plurality of bulk seeds and transfer each singulated seed to the seed deposition subsystem; and
   the seed distribution subsystem structured and operable to receive seeds from the individual seed transfer subsystem and the bulk seed transfer subsystem, and deposit the seeds into seed receptacles.

2. The system of claim 1, wherein the individual seed transfer subsystem comprises a seed storage tray dispenser structured and operable to retain and dispense one or more seed storage tray.

3. The system of claim 2, wherein the individual seed transfer subsystem further comprises a seed storage tray shuttle structured and operable to receive seed storage trays from the seed storage tray dispenser and transport the seed storage trays to a seed storage tray transfer station.

4. The system of claim 3, wherein the individual seed transfer subsystem further comprises a seed storage tray lid removing device structured and operable to de-lid each seed storage tray transported to the seed storage tray transfer station and deposit each lid into a lid receptacle.

5. The system of claim 3, wherein the individual seed transfer subsystem further comprises at least one imaging device structured and operable to capture image data of each seed storage tray transported to the seed storage tray transfer station.

6. The system of claim 5, wherein the individual seed transfer subsystem further comprises a seed storage tray transfer device structured and operable to transfer each seed storage tray from the seed storage tray transfer station to a seed storage tray flipping station, wherein the seed storage tray flipping station comprises a flipping table structured and operable to:
  receive each seed storage tray transferred from the seed storage tray transfer station;
  retain the seeds within the wells in the seed storage tray; and
  invert each seed storage tray such that the seeds in each well of the seed storage tray fall into a corresponding cell in a seed array tray positionable beneath the flipping station.

7. The system of claim 6, wherein the individual seed transfer subsystem further comprises a seed array tray shuttle structured and operable to transport the seed array from beneath the flipping station to a seed distribution station.

8. The system of claim 7, wherein the seed distribution subsystem comprises;
  a seed distribution shuttle; and
  a drop tube assembly including a plurality of drop tubes, wherein the seed distribution shuttle is structured and operable to receive seeds from the seed array tray and selectively deliver the seeds into selected ones of the drop tubes, and the drop tube assembly is structured and operable to deposit the seeds into the seed receptacles.

9. The system of claim 1, wherein the bulk seed transfer subsystem comprises:
  at least one bulk seed receptacle structured and operable to receive a plurality of bulk seeds;
  a seed transfer system structured and operable to transfer the bulk seed to a seed feeder; and
  a seed singulator structured and operable to receive the bulk seeds from the seed feeder and parse single seeds from the bulk seeds.

10. The system of claim 9, wherein the bulk seed transfer subsystem further comprises a seed indexer structured and operable to receive the parsed seeds one-at-a-time from the seed singulator and deliver the parsed seeds to the seed distribution station.

11. The system of claim 10, wherein the seed distribution subsystem comprises;
  a seed distribution shuttle; and
  a drop tube assembly including a plurality of drop tubes, wherein the seed distribution shuttle is structured and operable to receive seeds from the seed indexer and selectively deliver the seeds into selected ones of the drop tubes, and the drop tube assembly is structured and operable to deposit the seeds into the seed receptacles.

12. A high throughput method for depositing seed into seed receptacles, said system comprising:
  transferring seeds from wells in a seed storage tray to a seed deposition subsystem of a high throughput seed handling system, via an individual seed transfer subsystem of the high throughput seed handling system; and
  singulating a plurality of bulk seeds and transferring each singulated seed to the seed deposition subsystem; via a bulk seed transfer subsystem of the high throughput seed handling system; and
  receiving seeds from the individual seed transfer subsystem and the bulk seed transfer subsystem, and depositing the seeds into seed receptacles.

13. The method of claim 12, wherein the individual seed transfer subsystem further comprises a seed storage tray shuttle, the method further comprises receiving seed storage trays and transporting the seed storage trays to a seed storage tray transfer station.

14. The method of claim 13, wherein the individual seed transfer subsystem further comprises at least one imaging device, and the method further comprises capturing image data of each seed storage tray transported to the seed storage tray transfer station.

15. The method of claim 14, wherein the individual seed transfer subsystem further comprises a seed storage tray transfer device, and the method further comprises transferring each seed storage tray from the seed storage tray transfer station to a seed storage tray flipping station of the individual seed transfer subsystem, wherein the seed storage tray flipping station comprises a flipping table, and the method further comprises:
  receiving each seed storage tray transferred from the seed storage tray transfer station;
  retaining the seeds within the wells in the seed storage tray; and
  inverting each seed storage tray such that the seeds in each well of the seed storage tray fall into a corresponding cell in a seed array tray positionable beneath the flipping station.

16. The method of claim 15, wherein the individual seed transfer subsystem further comprises a seed array tray shuttle, and the method further comprises transporting the seed array from beneath the flipping station to a seed distribution station.

17. The method of claim 16, wherein the seed distribution subsystem comprises a seed distribution shuttle and a drop tube assembly including a plurality of drop tubes, and the method further comprises receiving seeds from the seed array tray and selectively delivering the seeds into selected ones of the drop tubes, and depositing the seeds into wells of the seed receptacles.

18. The method of claim 12, wherein the bulk seed transfer subsystem comprises at least one bulk seed receptacle, a seed transfer system, a seed feeder, and a seed singulator, wherein the method further comprises:
  receiving a plurality of bulk seeds at the at least one bulk seed receptacle;
  transferring the bulk seed to the seed feeder via the seed transfer system;
  transferring the seeds to the seed singulator, via the seed feeder; and
  parsing single seeds from the bulk seeds, via the seed singulator.

19. The method of claim 18, wherein the bulk seed transfer subsystem further comprises a seed indexer, that method further comprises receiving the parsed seeds one-at-a-time from the seed singulator and delivering the parsed seeds to the seed distribution station.

20. The method of claim 19, wherein the seed distribution subsystem comprises a seed distribution shuttle and a drop tube assembly including a plurality of drop tubes, and the method further comprises receiving seeds from the seed indexer and selectively delivering the seeds into selected ones of the drop tubes and depositing the seeds into the seed receptacles.

\* \* \* \* \*